United States Patent
Singh et al.

(10) Patent No.: US 8,505,401 B2
(45) Date of Patent: *Aug. 13, 2013

(54) SEVEN SPEED DUAL CLUTCH TRANSMISSION WITH FOUR AXES OF ROTATION

(75) Inventors: Tejinder Singh, Commerce Township, MI (US); Patrick S. Portell, Clarkston, MI (US); Henryk Sowul, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

This patent is subject to a terminal disclaimer.

(21) Appl. No.: 12/782,735

(22) Filed: May 19, 2010

(65) Prior Publication Data

US 2010/0319473 A1 Dec. 23, 2010

Related U.S. Application Data

(60) Provisional application No. 61/218,247, filed on Jun. 18, 2009.

(51) Int. Cl.
*F16H 3/08* (2006.01)

(52) U.S. Cl.
USPC ............................................................ 74/331

(58) Field of Classification Search
USPC .................. 74/330, 331, 332, 329, 340, 325, 74/339
See application file for complete search history.

(56) References Cited

U.S. PATENT DOCUMENTS

| | | | | |
|---|---|---|---|---|
| 7,340,973 | B2 * | 3/2008 | Hiraiwa | 74/330 |
| 7,360,466 | B2 * | 4/2008 | Seo | 74/331 |
| 7,383,749 | B2 * | 6/2008 | Schafer et al. | 74/340 |
| 7,621,195 | B2 * | 11/2009 | Hattori | 74/331 |
| 7,640,818 | B2 * | 1/2010 | Carey et al. | 74/330 |
| 8,156,836 | B2 * | 4/2012 | Remmler et al. | 74/331 |
| 8,266,977 | B2 * | 9/2012 | Mohlin et al. | 74/330 |
| 8,333,127 | B2 * | 12/2012 | Singh et al. | 74/330 |
| 2006/0169078 | A1 * | 8/2006 | Hiraiwa | 74/331 |
| 2006/0266144 | A1 * | 11/2006 | Schafer et al. | 74/340 |
| 2008/0134818 | A1 * | 6/2008 | Gitt | 74/330 |
| 2008/0134820 | A1 * | 6/2008 | Bjorck et al. | 74/331 |
| 2008/0202266 | A1 * | 8/2008 | Hendrickson et al. | 74/331 |

* cited by examiner

*Primary Examiner* — Ha D Ho
*Assistant Examiner* — Jude Agendia

(57) ABSTRACT

A transmission is connectable to an input member and includes an output gear, first and second shaft members, first and second countershaft members, a reverse shaft, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

18 Claims, 1 Drawing Sheet

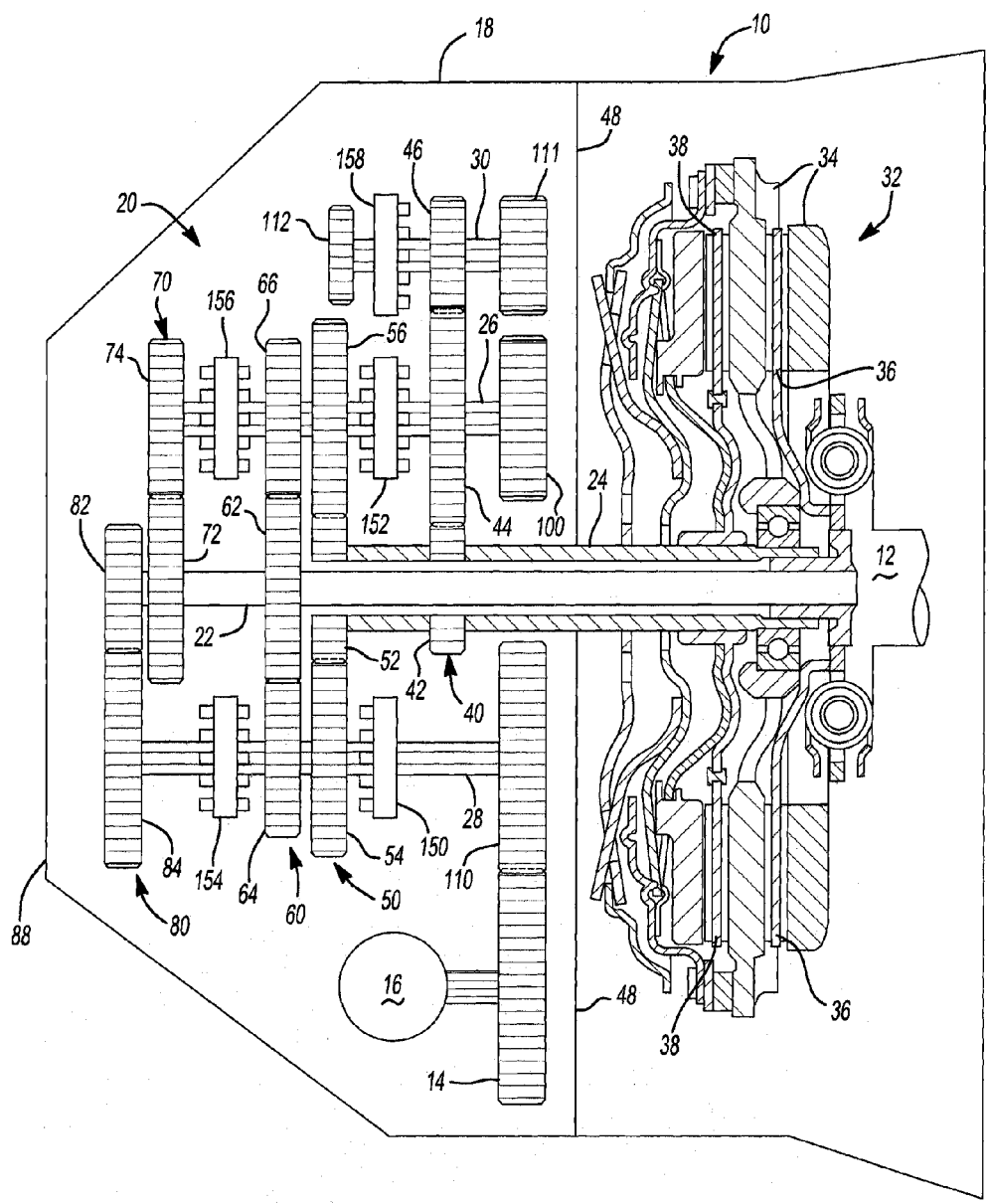

SEVEN SPEED DUAL CLUTCH TRANSMISSION WITH FOUR AXES OF ROTATION

CROSS-REFERENCE TO RELATED APPLICATIONS

This application claims priority to U.S. Provisional Application No. 61/218,247, filed on Jun. 18, 2009, which is hereby incorporated in its entirety herein by reference.

TECHNICAL FIELD

The present disclosure relates to transmissions and more particularly to a compact, dual clutch multiple speed transmission having four axes to establish seven or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output member, first and second shaft members, first and second countershaft members, a reverse, shaft, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In one aspect of the present invention, the transmission includes a transmission housing and a dual clutch assembly having a first and second clutch and a clutch housing. The clutch housing is connectable to a flywheel of an engine. The clutch housing is rotationally supported within the transmission housing.

In another aspect of the present invention, the transmission includes a first, second, third, fourth and fifth gear sets. The first gear set includes a first gear in mesh with a second gear and a reverse gear in mesh with the second gear, the second gear set includes a first gear in mesh with a second gear and a third gear, the third gear set includes a first gear in mesh with a second gear and a third gear, the fourth gear set includes a first gear in mesh with a second gear and the fifth gear set includes a first gear in mesh with a second gear.

In another aspect of the present invention, a first transmission input member is rotatably supported in the transmission housing. Each of the first gears of the third, fourth and fifth gear sets are rotatably fixed for common rotation with the first transmission input member.

In another aspect of the present invention, a second transmission input member is rotatably supported in the transmission housing. Each of the first gears of the first and second gear sets are rotatably fixed for common rotation with the second transmission input member. The second transmission input member is concentric with the first transmission input member and at least partially surrounds the first transmission input member.

In another aspect of the present invention, a first synchronizer assembly selectively connects the second gear of the second gear set to the second countershaft.

In another aspect of the present invention, a second synchronizer assembly selectively connects at least one of the second gear of the first gear set and the third gear of the second gear set to the first countershaft.

In another aspect of the present invention, a third synchronizer assembly selectively connects at least one of the second gear of the third gear set and the second gear of the fifth gear set to the second countershaft.

In another aspect of the present invention, a fourth synchronizer assembly selectively connects at least one of the third gear of the third gear set and the second gear of the fourth gear set to the first countershaft.

In another aspect of the present invention, a fifth synchronizer assembly selectively connects the reverse gear to the reverse shaft.

In another aspect of the present invention, a first countershaft transfer gear is fixed to the first countershaft for common rotation with the first countershaft, a second countershaft transfer gear is fixed to the second countershaft for common rotation with the second countershaft and a reverse shaft transfer gear is fixed to the reverse shaft for common rotation with the first reverse shaft. The first and second countershaft transfer gears and the reverse shaft transfer gear transfer torque from at least one of the first and second countershafts and reverse shaft to an output member.

In another aspect of the present invention, the selective engagement of dual clutch assembly interconnects the dual clutch housing with at least one of the first and the second transmission input members and the selective engagement of at least one of the synchronizer assemblies establishes at least one of seven forward speed ratios between the at least one of the first and the second transmission input members and the output member.

In another aspect of the present invention, two of the five co-planar gear sets are configured to produce two gear ratios each and two other of the five co-planar gear sets are configured to produce one gear ratio each.

In another aspect of the present invention, one of the five co-planar gear sets is configured to produce one forward gear ratio one reverse gear ratio.

In another aspect of the present invention, one of the five co-planar gear sets is configured to produce a reverse gear ratio using a reverse gear selectively connectable to a reverse shaft, wherein the reverse shaft is a separate shaft that is parallel with and spaced apart from the countershafts.

In another aspect of the present invention, one of the five co-planar gear sets includes a reverse gear and a park gear rotatable supported on a reverse shaft that is a fourth axis of rotation.

In yet another aspect of the present invention, the five synchronizer assemblies include three two-way synchronizers.

In yet another aspect of the present invention, the five synchronizer assemblies include two one-way synchronizers.

In yet another aspect of the present invention, the transmission is operable to provide at least seven forward speed ratios.

The above features and advantages and other features and advantages of the present invention are readily apparent from the following detailed description of the best modes for carrying out the invention when taken in connection with the accompanying drawings.

BRIEF DESCRIPTION OF THE DRAWING

FIG. 1 is a schematic view of an embodiment of a seven speed transmission, in accordance with the present invention.

DESCRIPTION

Referring to FIG. 1, a multiple speed transmission is generally indicated by reference number 10. The transmission 10 is connectable to an input member 12 and includes an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine or engine flywheel (not shown) or other torque producing machine to provide a driving torque to input member 12. The output member or gear 14 rotatably drives a final drive or differential assembly 16. The assembly 16 transfers torque delivered by output member 14, ultimately, to a pair road wheels (not shown).

The transmission 10 includes a housing 18 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 26, a second countershaft 28 and a reverse shaft 30. The second transmission input shaft or member 24 is a sleeve (hollow) shaft that is concentric with and overlies the first transmission input shaft or member 22. The first countershaft 26, the second countershaft 28 and the reverse shaft 30 are each spaced apart from and parallel with the first and second transmission input shaft members 22, 24. The first and second transmission input shafts 22, 24 define a first axis of rotation, the first countershaft 26 defines a second axis of rotation, the second countershaft 28 defines a third axis of rotation and the reverse shaft 30 defines a fourth axis of rotation.

A dual clutch assembly 32 is connectable between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24.

The gearing arrangement 20 also includes a plurality of co-planar, meshing gear sets 40, 50, 60, 70 and 80. The present invention contemplates that the plurality of co-planar, meshing gear sets 40, 50, 60, 70 and 80 may be arranged axially along transmission input shafts 22, 24 in an order other than that which is shown in FIG. 1 and still be within the scope of the invention. Co-planar gear set 40 includes gear 42, gear 44 and a reverse gear 46. Gear 42 is rotatably fixed and connected for common rotation with the second transmission input shaft member 24. Gear 44 is selectively connectable for common rotation with the first countershaft member 26 and meshes with gear 42. Reverse gear 46 meshes with gear 44 and is selectively connectable for common rotation with reverse shaft 30. It should be appreciated that gear 42 may be a separate gear structure fixed to the second transmission input shaft member 24 or gear teeth/splines formed on an outer surface of the second transmission input shaft member 24 without departing from the scope of the present invention. Gear set 40 is disposed proximate a wall 48 of the transmission housing 18 that is on a front or side of the transmission 10 proximate the dual clutch assembly 32.

Co-planar gear set 50 includes gear 52, gear 54 and gear 56. Gear 52 is rotatably fixed and connected for common rotation with the second transmission input shaft member 24 and meshes with gear 54 and gear 56. Gear 54 is selectively connectable for common rotation with the second countershaft member 28. Gear 56 is selectively connectable for common rotation with the first countershaft member 26. Gear set 50 is positioned adjacent gear set 40.

Co-planar gear set 60 includes gear 62, gear 64 and gear 66. Gear 62 is rotatably fixed and connected for common rotation with the first transmission input shaft member 22 and meshes with gear 64 and gear 66. Gear 64 is selectively connectable for common rotation with the second countershaft member 28. Gear 66 is selectively connectable for common rotation with the first countershaft member 26. Gear set 60 is disposed adjacent gear set 50.

Co-planar gear set 70 includes gear 72 and gear 74. Gear 72 is rotatably fixed and connected for common rotation with the first transmission input shaft member 22 and meshes with gear 74. Gear 74 is selectively connectable for common rotation with the first countershaft member 26. Gear set 70 is positioned adjacent gear set 60.

Co-planar gear set 80 includes gear 82 and gear 84. Gear 82 is rotatably fixed and connected for common rotation with the first transmission input shaft member 22 and meshes with gear 84. Gear 84 is selectively connectable for common rotation with the second countershaft member 28. Gear set 80 is positioned between gear set 70 and an end wall 88 of the transmission housing 18.

Further, a first countershaft transfer gear 100 is rotatably fixed and connected for common rotation with the first countershaft member 26. A second countershaft transfer gear 110 is rotatably fixed and connected for common rotation with the second countershaft member 28. A reverse shaft transfer gear 111 is rotatably fixed and connected for common rotation with the reverse shaft 30. First countershaft transfer gear 100, second countershaft transfer gear 110 and reverse shaft transfer gear 111 are each configured to mesh with output member 14. However, first countershaft transfer gear 100, second countershaft transfer gear 110 and reverse shaft transfer gear 111 do not mesh with each other. The first countershaft transfer gear 100 is disposed between gear 44 and end wall 48 of the transmission housing 18. The second countershaft transfer gear 110 is disposed between gear 54 and end wall 48 of the transmission housing 18. The reverse shaft transfer gear 111 is disposed between the reverse gear 46 and end wall 48 of the transmission housing 18. The output member 14 is co-planar with first and second countershaft transfer gears 100, 110 and reverse shaft transfer gear 111.

A park gear 112 is provided for placing transmission 10 in a park mode that prevents output member 14 from rotating. Park gear 112 is rotatably fixed and connected for common rotation with the reverse shaft 30. When the park mode is activated park gear 112 is rotatably fixed preventing reverse shaft 30 and transfer gear 111 from rotating, which thus prevents output gear 14 from rotating. Alternatively, the present invention contemplates fixedly disposing park gear 112 on the first or second countershafts 26, 28 to achieve the park mode function. Moreover, the axial location of park gear 112 along reverse shaft 30 may be changed in accordance with available packaging space.

The transmission 10 further includes a plurality of selectively engageable synchronizer assemblies 150, 152, 154, 156 and 158. Synchronizers 152, 154 and 156 are double sided synchronizers and generally include a shift fork (not shown) that is bi-directionally translated by an actuator (not shown) into at least two engaged positions and a neutral or disengaged position. In the present embodiment, synchronizer 152 is selectively actuatable to connect gear 44 for common rotation with the first countershaft member 26 and synchronizer 152 is selectively actuatable to connect gear 56 for common rotation with the first countershaft member 26. Synchronizer 154 is selectively actuatable to connect for common rotation gear 64 with the second countershaft 28 and is selectively actuatable to connect for common rotation gear 84 with the second countershaft 28. Synchronizer 156 is selectively actuatable to connect for common rotation gear 66 with the first countershaft member 26 and is selectively actuatable to connect for common rotation gear 74 with the first countershaft member 26.

Synchronizers 150 and 158 are single sided synchronizers that generally include a shift fork (not shown) that is bi-directionally translated by an actuator (not shown) into either an engaged position or a neutral or disengaged position. In the present embodiment, synchronizer 150 is selectively actuatable to connect for common rotation gear 54 with the second countershaft 28. Synchronizer 158 is selectively actuatable to connect reverse gear 46 for common rotation with the reverse shaft 30.

The transmission 10 is capable of transmitting torque from the input shaft 12 to the output gear member 14 in at least seven forward torque ratios and at least one reverse torque ratio. Each of the forward torque ratios and the reverse torque ratio is attained by selective engagement of the dual clutch assembly 32 and one or more of the synchronizer assemblies 150, 152, 154, 156 and 158. Those skilled in the art will readily understand that a different speed ratio is associated with each torque ratio.

It should be appreciated that each individual gear set 40, 50, 60, 70 and 80 and reverse gear 90 provides one or more forward and/or reverse gear ratios upon selective engagement of the synchronizer assemblies 150, 152, 154, 156 and 158. It should also be appreciated that a particular forward or reverse speed ratio may be achieved by different combinations of synchronizer and associated gear sets or gears without departing from the scope of the present invention.

For example, to establish the reverse torque ratio, clutch element 38 is engaged and synchronizer 158 is activated. Clutch element 38 couples the input member 12 with the second transmission input shaft member 24. Synchronizer 158 connects reverse gear 46 to the reverse shaft 30. More specifically, input torque from the input shaft 12 is transferred through the dual clutch assembly 32 to the second transmission input shaft member 24, through gear 42 to gear 44, through gear 44 to reverse gear 46, from reverse gear 46 to the reverse shaft 30 through synchronizer 158 to reverse transfer gear 111 and from reverse transfer gear 111 to the output member 14.

To establish a first forward torque ratio (i.e. a 1st gear), clutch element 36 is engaged and synchronizer 156 is activated. Clutch element 36 couples the input member 12 with the first transmission input shaft member 22. Synchronizer 156 couples gear 74 to the first countershaft member 26. Input torque from the input member 12 is transferred through the dual clutch assembly 32 to the first transmission input shaft member 22 to gear 72. Gear 72 transfers torque to gear 74 which transfers the torque to the first countershaft member 26 through synchronizer 156 and to first countershaft transfer gear 100 and then from first countershaft transfer gear 100 to the output member 14.

To establish a second forward torque ratio (i.e. a 2nd gear), clutch element 38 is engaged and synchronizer 152 is activated. Clutch element 38 couples the input member 12 to the second transmission input shaft member 24 which rotates gear 42. Synchronizer 152 couples gear 44 to the first countershaft member 26. Accordingly, input torque from the input member 12 is transferred through the dual clutch assembly 32 to the second transmission input shaft member 24, through gear 42 to gear 44, from gear 44 to synchronizer 152, from synchronizer 152 to the first countershaft member 26 and from the first countershaft member 26 to the first countershaft transfer gear 100 and the output member 14.

To establish a third forward torque ratio (i.e. a 3rd gear), clutch element 36 is engaged and synchronizer 156 is activated. Clutch element 36 couples the input member 12 to the first transmission input shaft member 22 which rotates gear 62. Synchronizer 156 couples gear 66 to the first countershaft member 26. Thus, input torque from the input member 12 is transferred through the dual clutch assembly 32 to the first transmission input shaft member 22, through gear 62 to gear 66, through gear 66 to synchronizer 156, from synchronizer 156 to the first countershaft member 26, from the first countershaft member 26 to the first countershaft transfer gear 100 and then from first countershaft transfer gear 100 to the output member 14.

To establish a fourth forward torque ratio (i.e. a 4th gear), clutch element 38 is engaged and synchronizer 152 is activated. Clutch element 38 couples the input member 12 to the second transmission input shaft member 24 which rotates gear 52. Synchronizer 152 couples gear 56 to the first countershaft member 26. Thus, input torque from the input member 12 is transferred through the dual clutch assembly 32 to the second transmission input shaft member 24 to gear 52, then from gear 52 to gear 56, from gear 54 to synchronizer 152, from synchronizer 152 to the first countershaft member 26, from the first countershaft member 26 to first countershaft transfer gear 100 and then from first countershaft transfer gear 100 to the output member 14.

To establish a fifth forward torque ratio (i.e. a 5th gear), clutch element 36 is engaged and synchronizer 154 is activated. Clutch element 36 couples the input member 12 to the first transmission input shaft member 22 which rotates gear 62. Synchronizer 154 couples gear 64 to the second countershaft member 28. Input torque from the input member 12 is transferred through the dual clutch assembly 32 to the first transmission input shaft member 22, from first transmission input shaft member 22 to gear 62, from gear 62 to gear 64, from gear 64 to the second countershaft member 28 through synchronizer 154, to second countershaft transfer gear 110 and from second countershaft transfer gear 110 to the output member 14.

To establish a sixth forward torque ratio (i.e. a 6th gear), clutch element 38 is engaged and synchronizer 150 is activated. Clutch element 38 couples the input member 12 to the second transmission input shaft member 24 which rotates gear 52. Synchronizer 150 couples gear 54 to the second countershaft member 28. Thus, input torque from the input member 12 is transferred through the dual clutch assembly 32 to the second transmission input shaft member 24 to gear 52, then from gear 52 to gear 54, from gear 54 to synchronizer 150, from synchronizer 150 to the second countershaft member 28, from the second countershaft member 28 to second countershaft transfer gear 110 and then from second countershaft transfer gear 110 to the output member 14.

To establish a seventh forward torque ratio (i.e. a 7th gear), clutch element 36 is engaged and synchronizer 154 is activated. Clutch element 36 couples the input member 12 to the first transmission input shaft member 22 which rotates gear 82. Synchronizer 154 couples gear 84 to the second countershaft member 28. Input torque from the input member 12 is transferred through the dual clutch assembly 32 to the first transmission input shaft member 22, from first transmission input shaft member 22 to gear 82, from gear 82 to gear 84, from gear 84 to the second countershaft member 28 through synchronizer 154, to second countershaft transfer gear 110 and from first countershaft transfer gear 110 to the output member 14.

Again, it should be appreciated that any one of the gear sets of gear sets 40, 50, 60, 70 and 80 and reverse gear 46 may be changed to produce a certain forward and reverse torque ratio without departing from the scope of the present invention.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art. For example, each of the double synchronizer assemblies 152, 154, 156 is driven by one fork and one rail assembly. Moreover, each of the single synchronizer assemblies 150, 158 is driven by two forks on the same rail assembly. Hence, there are four rails to drive all five synchronizers. Furthermore, countershafts 26, 28 can switch positions. Thus, a transmission having a more simplified actuation and control system, reduced mass and cost and improved packaging is achieved.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
    a transmission housing;
    a dual clutch assembly having a clutch housing connectable to an engine output member, wherein the clutch housing is rotationally supported within the transmission housing;
    a first, second, third, fourth and fifth gear set, wherein the first gear set is located adjacent the dual clutch assembly and includes a first gear in mesh with a second gear and a reverse gear in mesh with the second gear, the second gear set is located adjacent the first gear set and includes a first gear in mesh with a second gear and a third gear, the third gear set is located adjacent the second gear set and includes a first gear in mesh with a second gear and a third gear, the fourth gear set is located adjacent the third gear set and includes a first gear in mesh with a second gear, and the fifth gear set is adjacent the fourth gear set and includes a first gear in mesh with a second gear;
    a first transmission input member rotatably supported in the transmission housing, and wherein each of the first gears of the third, fourth and fifth gear sets are rotatably fixed for common rotation with the first transmission input member;
    a second transmission input member rotatably supported in the transmission housing, wherein each of the first gears of the first and second gear sets are rotatably fixed for common rotation with the second transmission input member and wherein the second transmission input member is concentric with the first transmission input member and at least partially surrounds the first transmission input member;
    a first countershaft rotatably supported within the transmission housing and spaced apart from and parallel with the first and second transmission input members, wherein the second gear of the first gear set, the third gear of the second gear set, the third gear of the third gear set and the second gear of the fourth gear set are each selectively connectable for common rotation with the first countershaft;
    a second countershaft rotatably supported within the transmission housing and spaced apart from and parallel with the first and second transmission input members, wherein the second gear of the second gear set, the second gear of the third gear set and the second gear of the fifth gear set are each selectively connectable for common rotation with the second countershaft;
    a reverse shaft rotatably supported in the transmission housing and spaced apart from and parallel with the first and second transmission input members for rotatably supporting the reverse gear, wherein the reverse gear is selectively connectable for common rotation with the reverse shaft;
    five synchronizer assemblies for selectively coupling at least one of the gears of the first, second, third, fourth and fifth gear sets with at least one of the first countershaft, the second countershaft and reverse shaft, and
    wherein the selective engagement of dual clutch assembly interconnects the dual clutch housing with at least one of the first and the second transmission input members and the selective engagement of at least one of the five synchronizer assemblies establishes at least one of seven forward speed ratios.

2. The transmission of claim 1 wherein a first of the five synchronizer assemblies selectively connects the second gear of the second gear set to the second countershaft.

3. The transmission of claim 2 wherein a second of the five synchronizer assemblies selectively connects at least one of the second gear of the first gear set and the third gear of the second gear set to the first countershaft.

4. The transmission of claim 3 wherein a third of the five synchronizer assemblies selectively connects at least one of the second gear of the third gear set and the second gear of the fifth gear set to the second countershaft.

5. The transmission of claim 4 wherein a fourth of the five synchronizer assemblies selectively connects at least one of the third gear of the third gear set and the second gear of the fourth gear set to the first countershaft.

6. The transmission of claim 5 wherein a fifth of the five synchronizer assemblies selectively connects the reverse gear to the reverse shaft.

7. The transmission of claim 1 wherein the dual clutch assembly includes a first clutch and a second clutch, wherein the second clutch is configured to selectively connect the clutch housing to the second transmission input member and wherein the five synchronizer assemblies includes a first synchronizer assembly for selectively connecting the second gear of the second gear set to the second countershaft to establish a sixth gear ratio.

8. The transmission of claim 7 wherein the dual clutch assembly includes a first clutch and a second clutch, wherein the second clutch is configured to selectively connect the clutch housing to the second transmission input member and wherein the five synchronizer assemblies includes a second synchronizer assembly for selectively connecting the second gear of the first gear set to the first countershaft to establish a second gear ratio.

9. The transmission of claim 7 wherein the dual clutch assembly includes a first clutch and a second clutch, wherein the second clutch is configured to selectively connect the clutch housing to the second transmission input member and wherein the five synchronizer assemblies includes a second synchronizer assembly for selectively connecting the third gear of the second gear set to the first countershaft to establish a fourth gear ratio.

10. The transmission of claim 7 wherein the dual clutch assembly includes a first clutch and a second clutch, wherein the first clutch is configured to selectively connect the clutch housing to the first transmission input member and wherein the five synchronizer assemblies includes a third synchronizer assembly for selectively connecting the second gear of the third gear set to the second countershaft to establish a fifth gear ratio.

11. The transmission of claim 7 wherein the dual clutch assembly includes a first clutch and a second clutch, wherein the first clutch is configured to selectively connect the clutch housing to the first transmission input member and wherein the five synchronizer assemblies includes a third synchronizer assembly for selectively connecting the second gear of the fifth gear set to the second countershaft to establish a seventh gear ratio.

12. The transmission of claim 7 wherein the dual clutch assembly includes a first clutch and a second clutch, wherein the first clutch is configured to selectively connect the clutch housing to the first transmission input member and wherein the five synchronizer assemblies includes a fourth synchronizer assembly for selectively connecting the third gear of the third gear set to the first countershaft to establish a third gear ratio.

13. The transmission of claim 7 wherein the dual clutch assembly includes a first clutch and a second clutch, wherein the first clutch is configured to selectively connect the clutch housing to the first transmission input member and wherein the five synchronizer assemblies includes a fourth synchronizer assembly for selectively connecting the second gear of the fourth gear set to the first countershaft to establish a first gear ratio.

14. The transmission of claim 7 wherein the dual clutch assembly includes a first clutch and a second clutch, wherein the second clutch is configured to selectively connect the clutch housing to the second transmission input member and wherein the five synchronizer assemblies includes a fifth synchronizer assembly for selectively connecting the reverse gear to the reverse shaft to establish a reverse gear ratio.

15. The transmission of claim 1 further comprising a first countershaft transfer gear fixed to the first countershaft for common rotation with the first countershaft, a second countershaft transfer gear fixed to the second countershaft for common rotation with the second countershaft and a reverse shaft transfer gear fixed to the reverse shaft for common rotation with the first reverse shaft and wherein the first and second countershaft transfer gears and the reverse shaft transfer gear transfer torque from at least one of the first and second countershafts and reverse shaft to an output member.

16. The transmission of claim 15 wherein the output member is a gear that meshes with the each of the first and second countershaft transfer gears and the reverse shaft transfer gear.

17. The transmission of claim 15 further comprising a park gear fixed to the reverse shaft, wherein the park gear is configured to prevent rotation of the reverse shaft transfer gear and the output gear when the park gear is engaged.

18. A transmission comprising:
a transmission housing;
a dual clutch assembly having a first and second clutch and a clutch housing, wherein the clutch housing is connectable to a flywheel of an engine and wherein the clutch housing is rotationally supported within the transmission housing;
a first, second, third, fourth and fifth gear set, wherein the first gear set is located adjacent the dual clutch assembly and includes a first gear in mesh with a second gear and a reverse gear in mesh with the second gear, the second gear set is located adjacent the first gear set and includes a first gear in mesh with a second gear and a third gear, the third gear set is located adjacent the second gear set and includes a first gear in mesh with a second gear and a third gear, the fourth gear set is located adjacent the third gear set and includes a first gear in mesh with a second gear, and the fifth gear set is adjacent the fourth gear set and includes a first gear in mesh with a second gear;
a first transmission input member rotatably supported in the transmission housing, and wherein each of the first gears of the third, fourth and fifth gear sets are rotatably fixed for common rotation with the first transmission input member;
a second transmission input member rotatably supported in the transmission housing, wherein each of the first gears of the first and second gear sets are rotatably fixed for common rotation with the second transmission input member and wherein the second transmission input member is concentric with the first transmission input member and at least partially surrounds the first transmission input member;
a first synchronizer assembly selectively connects the second gear of the second gear set to the second countershaft;
a second synchronizer assembly selectively connects at least one of the second gear of the first gear set and the third gear of the second gear set to the first countershaft;
a third synchronizer assembly selectively connects at least one of the second gear of the third gear set and the second gear of the fifth gear set to the second countershaft;

a fourth synchronizer assembly selectively connects at least one of the third gear of the third gear set and the second gear of the fourth gear set to the first countershaft;

a fifth synchronizer assembly selectively connects the reverse gear to the reverse shaft; and a first countershaft transfer gear fixed to the first countershaft for common rotation with the first countershaft, a second countershaft transfer gear fixed to the second countershaft for common rotation with the second countershaft and a reverse shaft transfer gear fixed to the reverse shaft for common rotation with the first reverse shaft and wherein the first and second countershaft transfer gears and the reverse shaft transfer gear transfer torque from at least one of the first and second countershafts and reverse shaft to an output member, and wherein the selective engagement of dual clutch assembly interconnects the dual clutch housing with at least one of the first and the second transmission input members and the selective engagement of at least one of the synchronizer assemblies establishes at least one of seven forward speed ratios between the at least one of the first and the second transmission input members and the output member.

* * * * *